United States Patent
Petri et al.

(10) Patent No.: US 12,228,184 B2
(45) Date of Patent: Feb. 18, 2025

(54) MOTOR VEHICLE DISC BRAKE LINING WITH FRICTION LINING RESETTING SPRING

(71) Applicant: Continental Teves AG & Co. oHG, Frankfurt am Main (DE)

(72) Inventors: Ralph Petri, Frankfurt am Main (DE); Kilian Bashayan, Frankfurt am Main (DE); Sebastian Salzmann, Frankfurt am Main (DE)

(73) Assignee: CONTINENTAL AUTOMOTIVE TECHNOLOGIES GMBH, Hanover (DE)

( * ) Notice: Subject to any disclaimer, the term of this patent is extended or adjusted under 35 U.S.C. 154(b) by 362 days.

(21) Appl. No.: 17/602,479

(22) PCT Filed: Apr. 3, 2020

(86) PCT No.: PCT/EP2020/059518
§ 371 (c)(1),
(2) Date: Oct. 8, 2021

(87) PCT Pub. No.: WO2020/212169
PCT Pub. Date: Oct. 22, 2020

(65) Prior Publication Data
US 2022/0205500 A1  Jun. 30, 2022

(30) Foreign Application Priority Data

Apr. 17, 2019 (DE) .................. 10 2019 205 625.3
Aug. 28, 2019 (DE) .................. 10 2019 212 896.3

(51) Int. Cl.
*F16D 65/097* (2006.01)
*F16D 55/22* (2006.01)
*F16D 65/54* (2006.01)

(52) U.S. Cl.
CPC ......... *F16D 65/0979* (2013.01); *F16D 55/22* (2013.01); *F16D 65/543* (2013.01)

(58) Field of Classification Search
CPC .. F16D 55/22; F16D 65/0006; F16D 65/0025; F16D 65/0978; F16D 65/0979; F16D 65/543
See application file for complete search history.

(56) References Cited

U.S. PATENT DOCUMENTS

| | | | |
|---|---|---|---|
| 4,364,455 A | 12/1982 | Oshima | |
| 4,515,249 A | 5/1985 | Escarabajal et al. | |

(Continued)

FOREIGN PATENT DOCUMENTS

| | | |
|---|---|---|
| CN | 104583635 A | 4/2015 |
| CN | 105822699 A | 8/2016 |

(Continued)

OTHER PUBLICATIONS

International Search Report and Written Opinion for International Application No. PCT/EP2020/059518, mailed Jun. 22, 2020, with partial English translation, 9 pages,.

(Continued)

*Primary Examiner* — Vishal R Sahni
(74) *Attorney, Agent, or Firm* — Buchanan Ingersoll & Rooney PC

(57) ABSTRACT

A motor vehicle disc brake lining having friction material fixed on the front side of a back plate, and a resetting spring fixed releasably or non-releasably on the rear side of the back plate with a base and an elastic resetting spring bow. The resetting spring bow sits elastically on an assigned abutment of a holder such that the motor vehicle disc brake lining can be reset to be axially distanced from a brake disc in the released brake state. The friction lining resetting spring has a spring characteristic curve which is additively (Continued)

composed of a plurality of portions including a plurality of quasi-linear straight portions and, interposed in-between, at least one curved transition portion, each having mutually differently defined gradient angles, and among the portions there is at least one portion which is at least partially plastically deformable and serves to automatically allow demand-oriented spring-back based on wear compensation.

17 Claims, 14 Drawing Sheets

(56) References Cited

U.S. PATENT DOCUMENTS

| | | | |
|---|---|---|---|
| 5,284,228 A | | 2/1994 | Weiler et al. |
| 5,388,670 A | * | 2/1995 | Kuskye .................. F16D 66/02 |
| | | | 188/73.38 |
| 6,527,090 B1 | * | 3/2003 | Barillot ............... F16D 65/0978 |
| | | | 188/73.1 |
| 8,540,060 B2 | | 9/2013 | Hayashi et al. |
| 8,636,119 B2 | | 1/2014 | Bach et al. |
| 8,869,950 B2 | | 10/2014 | Maehara et al. |
| 9,528,564 B2 | | 12/2016 | Mallmann |
| 9,568,059 B2 | | 2/2017 | Yukumi et al. |
| 9,677,629 B2 | | 6/2017 | Boyle et al. |
| 9,869,357 B2 | | 1/2018 | Knoop et al. |
| 10,030,729 B2 | * | 7/2018 | Foucoin ................. F16D 65/543 |
| 10,495,165 B2 | | 12/2019 | Mallmann |
| 10,697,504 B2 | | 6/2020 | Tomasz et al. |
| 10,738,844 B2 | | 8/2020 | Fricke et al. |
| 10,982,729 B2 | | 4/2021 | Baumgartner |
| 11,209,056 B2 | | 12/2021 | Salzmann et al. |
| 2004/0222053 A1 | * | 11/2004 | Wemple .............. F16D 65/0977 |
| | | | 188/73.38 |
| 2014/0339026 A1 | | 11/2014 | Gutelius et al. |
| 2015/0211589 A1 | * | 7/2015 | Mallmann .......... F16D 65/0977 |
| | | | 188/73.38 |
| 2015/0247542 A1 | * | 9/2015 | Yukumi .............. F16D 55/2265 |
| | | | 188/72.3 |
| 2018/0355932 A1 | | 12/2018 | Mallmann |

FOREIGN PATENT DOCUMENTS

| | | |
|---|---|---|
| CN | 107429766 A | 12/2017 |
| DE | 3023103 A1 | 1/1981 |
| DE | 4110850 A1 | 10/1992 |
| DE | 102012006082 A1 | 9/2013 |
| DE | 102013208001 A1 | 12/2013 |
| DE | 102013207424 A1 | 10/2014 |
| DE | 112013004669 T5 | 7/2015 |
| DE | 202015104454 U1 | 10/2015 |
| DE | 102016211147 A1 | 6/2016 |
| DE | 102015111166 A1 | 1/2017 |
| DE | 102016202520 A1 | 8/2017 |
| DE | 102017113399 A1 | 12/2018 |
| EP | 0100273 A1 | 2/1984 |
| EP | 2411694 B1 | 1/2013 |
| EP | 2644926 A1 | 10/2013 |
| EP | 2775159 A1 | 9/2014 |
| FR | 3089268 A1 | 6/2020 |
| JP | 01188729 A | 7/1989 |
| JP | 0725342 U | 5/1995 |
| JP | 2002174276 A | 6/2002 |
| JP | 2009041769 A | 2/2009 |
| JP | 2010169149 A | 8/2010 |
| JP | 2011094696 A | 5/2011 |
| JP | 2012063014 A | 3/2012 |
| JP | 5184693 82 | 4/2013 |
| JP | 5916875 B2 | 5/2016 |
| JP | 2017133588 A | 8/2017 |
| KR | 10-2018-0108826 A | 10/2018 |
| WO | 9503499 A1 | 2/1995 |
| WO | 2011126125 A1 | 10/2011 |
| WO | 2016135118 A1 | 9/2016 |
| WO | 2017060513 A1 | 4/2017 |

OTHER PUBLICATIONS

German Examination Report for German Application No. 10 2019 212 896.3, dated Sep. 29, 2021 with translation, 16 pages.
European Examination Report for EP Application No. 20717160.4, dated Jul. 6, 2023 with translation, 9 pages.
Chinese Office Action for Chinese Application No. 202080029354. 2, dated Nov. 2, 2022 with translation, 18 pages.
Chinese Notice of Allowance for Chinese Application No. 202080029354.2, dated May 18, 2023 with partial translation, 7 pages.
Korean Request for Submission of an Opinion for Korean Application No. 10-2021-7032396, dated Feb. 27, 2023 with translation, 13 pages.
Office Action (Decision for Grant of Patent) issued May 31, 2024, by the Korean Intellectual Property Office in corresponding Korean Patent Application No. 10-2021-7032396 and an English translation of the Office Action. (6 pages).

* cited by examiner

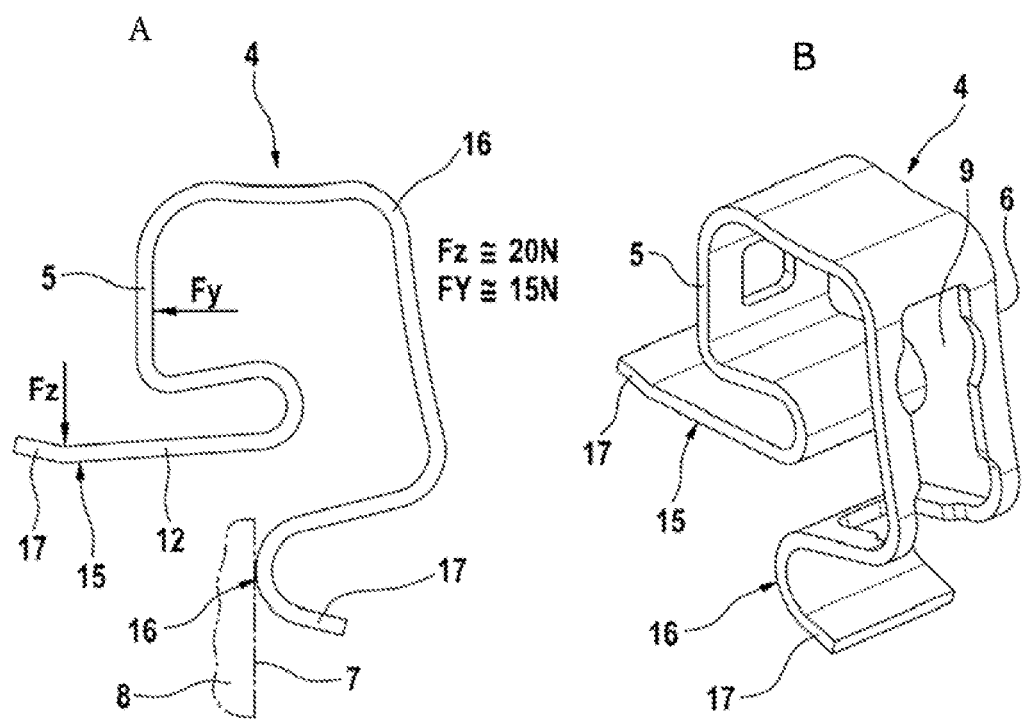
Fig. 6
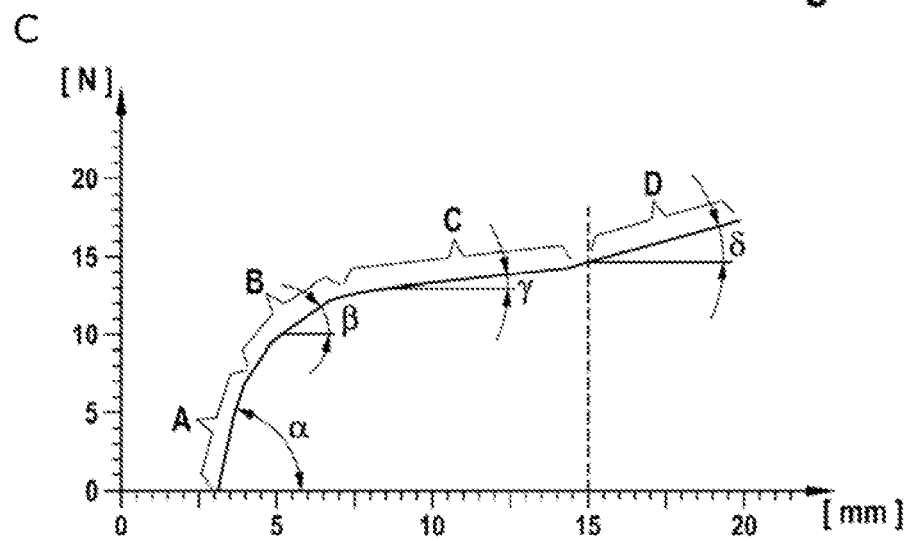

MOTOR VEHICLE DISC BRAKE LINING WITH FRICTION LINING RESETTING SPRING

CROSS REFERENCE TO RELATED APPLICATIONS

This application is the U.S. National Phase Application of PCT International Application No. PCT/EP2020/059518, filed Apr. 3, 2020, which claims priority to German Patent Application No. 10 2019 212 896.3, filed Aug. 28, 2019 and German Patent Application No. 10 2019 205 625.3, filed Apr. 17, 2019, the contents of such applications being incorporated by reference herein.

FIELD OF THE INVENTION

The invention relates to disc brake lining assemblies.

BACKGROUND OF THE INVENTION

A known motor vehicle disc brake, such as in particular a known motor vehicle disc brake lining with integrated plate resetting spring, is known for example from JP 2012-63014 A, incorporated herein by reference. The resetting springs of the friction linings have a base which sits non-releasably on a rear side of a back plate of the disc brake lining. A resetting spring bow bent into an approximately Δ- (delta-) shape adjoins this base and is bent laterally parallel to the tangential direction, and sits elastically deformably on an end face of a brake holder. A slide plate arrangement is also inserted separately in the holder, so that the motor vehicle disc brake lining is received in the holder via the slide plate. The holder also carries a brake caliper mounted so as to be relatively displaceable. In this disc brake system, the elastic plate resetting spring serves to ensure that after each brake actuation, i.e. in the released brake state, the motor vehicle disc brake lining is always retracted to a fixedly defined rest position which is offset axially distanced from a brake disc. As a result, residual braking moments are reliably avoided.

FIG. 2 of DE 30 23 103 A1, incorporated herein by reference, describes a partial lining disc brake, in which the indirectly actuated motor vehicle disc brake lining is equipped with a resetting spring bow bent laterally sideways in the tangential direction and resting on the holder, wherein the resetting spring is fixed to the friction lining. Furthermore, the resetting spring is configured as a twistable torsion coil spring made of wire, the end of which is held by compression in an opening of the back plate. Torsion force is stored in the coil spring due to the hydraulic piston movement. The torsion coil spring may also be deformed plastically if the elastic deformation exceeds a predefined amount, in order to keep the elastic force of the friction lining resetting spring at a low level. In this respect however, no sheet metal resetting spring variant is disclosed.

A totally different mechanism in conjunction with a sliding plate fixed to the holder arises from U.S. Pat. No. 9,528,564 B2, incorporated herein by reference. This contains a resetting spring bow bent into a Δ- (delta-) shape, which is configured as an integral, one-piece part of the integral separate sliding plate spring assembly, and wherein the sliding plate spring assembly is mounted immovably in the holder.

U.S. Pat. No. 10,030,729 B2, incorporated herein by reference, concerns a motor vehicle disc brake which is equipped with sliding plate segments in the holder, and is designed as a replacement kit for an individually adaptable aftermarket spring assembly which can be flexibly installed. For this, an indirectly actuatable friction lining may have a plastically deformable, individually adaptable resetting spring made of sheet metal, the spring bow of which folds substantially in a Δ (delta) shape in the tangential direction i.e. sideways, and surrounds the back plate at the side in order to grip with a tab on the front side of the friction lining back plate. This sheet metal resetting spring is designed so as to be plastically deformable, in that it has three bending axes P1, P2, P3 which are oriented parallel to one another. For the purpose of individual springing in a radial direction, in addition a separately clippable, sheet metal bow spring is defined, the spring bow of which extends in the radial direction.

DE 10 2016 211 147 A1, incorporated herein by reference, describes the resetting spring assembly extending tangentially to the side of the friction lining, and also comprising a resetting spring automatically compensating for lining wear, including a latching toothed profile for the purpose of friction lining wear adjustment.

DE 10 2012 006 082 A1, incorporated herein by reference, concerns a floating caliper disc brake suitable for heavy pneumatic truck brakes, comprising a resetting device oriented laterally in the tangential direction including correspondingly adapted friction lining with back plate, and for increased robustness recommends the tangentially oriented claw spring which has a sharp, hardened claw edge for cooperation with a holder, and wherein the claw spring should have a quite particularly stiff characteristic.

DE 11 2013 004 669 T5, incorporated herein by reference, concerns a motor vehicle disc brake with disc brake linings which both comprise a spring arrangement bent with integral complex curvature in all spatial directions. Three spring bows are provided which are active in different spatial directions. A radially outwardly bent resetting spring bow loads the holder, and loads the motor vehicle disc brake lining in the axial direction. Furthermore, this resetting spring bow also allows a friction lining positioning comprising a pivot moment M relative to the contact face. Accordingly, a tilt tendency is countered. The first embodiment in FIGS. 4+5 shows the radially outwardly bent axial spring leg and the mainly axially extending radial spring leg and tangential spring leg in each case. The spring assembly is formed from an integrally cut and shaped metal plate which is fixed to the tab portions of a back plate.

SUMMARY OF THE INVENTION

An aspect of the present invention is based on of avoiding the disadvantages of the prior art, and with little complexity (low material requirements, simple production and simple self-evident exchange of friction linings), provides an efficiently refined sprung motor vehicle disc brake lining which also allows a particularly compact construction. The object is furthermore rationalisation, i.e. offering one spring configuration, essentially without design change, both for conventional brake calipers and also for combined actuation brake calipers (integrating an electric motor). In addition, a variation is possible which for all applications allows a reliably and rationally improved, pre-mountable motor vehicle disc brake structure with a compact construction and clear assembly division.

A particular advantage of an aspect of the present invention is that an automatic idle travel reduction function is possible depending on summary wear compensation, so that the refined disc brakes according to an aspect of the invention allow a particularly reliable, resource-protective and efficient vehicle design because a particularly rapid braking effect can be achieved avoiding idle travel and with simple and economic replacement. The logistics remain simple because in principle no additional attachment is fitted other than the disc brake friction lining system. Further details of an aspect of the invention will become apparent from dependent claims together with the description with reference to the drawing.

It has been found that the very different disc brake configurations (sliding caliper brakes and also fixed caliper brakes) may require quite different resetting spring designs, with the result that unfortunately no general resetting optimization is possible. It is at this exact point that an aspect of the present invention brings benefits.

An aspect of the present invention meets the need for a refined resetting spring which offers a compact solution, protected against incorrect installation, for application for a sliding caliper brake.

This problem is achieved in a comparatively general embodiment, i.e. universally, in conjunction with a particularly novel resetting spring which is composed segmented in portions, using a resetting spring characteristic curve modeling with the feature that a resetting spring according to an aspect of the invention fits precisely into the resetting spring force flow including the shape modification energy hypothesis. In this context, the desired resetting spring characteristic curve is achieved with a modified spring curve design, with cold-formed, customized forming design of the resetting spring, and in conjunction with a suitable resetting spring placing.

An aspect of the present invention in its most general form concerns an optimized resetting spring or an optimized friction lining, or an optimized sliding caliper disc brake system which allows a universally adaptable, optimized resetting spring arrangement based on the optimized spring characteristic curve, wherein in a preferred sliding caliper interpretation, a suitably adapted holder is provided for rotationally fixed holding of the appropriate friction linings and for mounting of a brake housing which is mounted so as to be relatively displaceable.

A first hereby disclosed interpretation I of the resetting spring invention is understood to a certain extent as an independent, axially relatively displaceably mounted, double action yoke spring embodiment which is designed in a fork shape, so that the resetting spring effect is achieved with two spring legs clamped between the two friction linings mounted opposite one another and displaceable in parallel, such that a synchronized or differential resetting spring effect is possible. A second hereby disclosed interpretation II of the resetting spring according to an aspect of the invention is defined as a friction lining attachment fixedly installed on the back plate side, so that this resetting spring is not present as a separate component but in each case is clamped between the described friction lining and the spring support point, such as in particular a brake holder support or brake housing support. A third disclosed interpretation III of a resetting spring according to an aspect of the invention concerns finally a sliding plate integration.

Here, this novel resetting spring design firstly defines a targeted resetting spring characteristic curve on the basis of a predefined preload spring force level A, which is placed in targeted fashion as an input or primary parameter substantially approximately at or shortly before one end of a Hooke's spring characteristic curve region. This predefined preload spring force level is set tightly and simultaneously limited, such that a resetting spring mounting (for new installation or friction lining replacement) is possible even without plastic resetting spring deformation. In a further embodiment of the invention, it is possible that the above-mentioned predefined preload force level as the decisive input parameter is immediately and directly followed by a constant operating spring characteristic curve portion B which is plateau-like in the broadest sense, and substantially characterized in that with increasing continued i.e. growing spring deformation (spring travel or brake wear), a largely constant resetting spring force is predefined, with the result that identical clearance behavior applies. In other words, the defined preload force level A is followed by an operating characteristic curve region B with identical, or largely linearly constant, defined force-travel characteristic curve behavior, with the result that the clearance behavior does not increase substantially or at least not decisively, because any spring force rise is compensated by a planned, measured plastic resetting spring deformation. It is important that the length of the quasi-constant operating characteristic curve region B is adequately dimensioned and set such that the block characteristic curve region C is placed at a sufficient distance from the operating characteristic curve region B. This is because a comparatively strongly growing rise in the force-travel behavior, which is not compatible with the objectives of an aspect of the present invention, is associated with the start of the block characteristic curve region C.

According to an aspect of the invention, the operating characteristic curve region B is found automatically in self-acting fashion, as a result of continued brake wear. Accordingly, the resetting spring force is defined as largely constant over the entire operating characteristic curve region B. As a result, a vehicle driver/vehicle brake system enjoys a constant clearance behavior, which is defined independently of wear, because a constant idle travel is defined.

The aim is a particularly reliable, novel and low-maintenance, refined sliding caliper partial lining disc brake with resetting device which, in comparison with the respective prior art, advantageously allows further refined properties while avoiding the disadvantages. In particular, depending on any maintenance fault or wearing part state, to a certain extent a robust solution for a constant clearance is automatically provided.

An aspect of the present invention comprises a resetting device which includes at least one spring leg which is firstly fixed by a foot point on a back plate of a friction lining which itself is received rotationally fixedly and guided axially displaceably in a brake carrier, and secondly sits with a free spring bow end on a support of a brake carrier; and wherein a predefined force-travel spring characteristic curve of the resetting device over the entire friction lining life combines both a largely linear-elastic-reversible spring characteristic curve portion and also a largely constant-plastic spring characteristic curve portion, such that the resetting effect of this resetting device remains substantially constant with progressive wear travel over the entire friction lining service life.

An aspect of the present invention differs from all prior constructions in that a particularly planned shape modification of a structural element or brake component (friction lining resetting spring), which does not constitute a usual brake wear component in the tightest sense, in normal use is definedly calculated in (in particular, desired). In a diametrically opposed school of thought, accordingly an essential measure of an aspect of the present invention is that an irreversible plastic deformation of the resetting device is deliberately provoked to a predefined restricted extent, in order to provide the constant, unchangingly desired system characteristic curve behavior over the friction lining wear distance.

In a further advantageous embodiment of the invention, the invention provides that the predefined plastic deformation component is substantially matched to the wear level of the friction components, i.e. cumulatively matched to the friction lining wear and brake rotor wear. In other words, the lost wear volume of the friction components is automatically compensated, with absence of current, by the plastic deformation of the resetting device.

Furthermore, additional components or elements of a resetting spring are disclosed which provide an integrally designed component of a formed resetting spring made of sheet steel material, wherein the resetting spring is fixed by a foot to a back side of a back plate of a friction lining. In this context, the resetting spring component may for example—independently or alternatively, in extensive or arbitrary combination with and among each other—comprise an additional spring leg for the purpose of additional springing in an alternative orientation direction with contact on a holder or brake housing, and/or an additional leg as a slide aid or further springing measure for contact and/or support or springing in an alternative orientation direction on a holder or brake housing.

The foot of the resetting spring is advantageously riveted to the back side of the back plate.

The semifinished sheet steel for production of the resetting spring according to an aspect of the invention may for example be a stainless high alloy steel material, such as in particular for example X10CrNi18-8.

The drawing illustrates widely varying variants of resetting springs which are individually but nonetheless easily variably configured to be cuttable particularly suitably by punching or by jet cutting (e.g. laser or waterjet cutting), wherein these usually symmetrical shapes can be arranged immediately next to one another in a sheet strip development, immediately adjoining one another, so as to save material. All resetting spring metal strips are brought into a fundamentally bow-shaped spring winding form in a third spatial Z dimension, which to a certain extent follows the metal thickness, providing the portions which are bent curving towards one another.

All resetting spring variants of a first spring generation, almost without exception, have a largely strip-like straight and narrow (i.e. longer than wide, or cuboid) outer contour in the form of a compact thin sheet steel strip (maximum metal thickness approx 1.5 mm), which each integrate a perforated foot portion for rivet fixing with suitable flat support on a back side of a back plate. Each resetting spring blank also, in addition to its cuboid, closed, smooth box-like outer contour, has one or more inner cutouts in its spring bow, cut in the form of modelled windows. The inner cutouts may be connected to one another or alternatively several individual inner cutouts are formed separately from one another. These inner cutouts in the spring bow serve primarily, in conjunction with any strain-hardening to be applied to a limited extent in the context of spring production or during bending/winding into the desired form, also to reproduce the required operating characteristic curve portion B with the required spring characteristic curve behavior. Because a generous arc curvature implies only relatively restricted strain-hardening effect in a single bending process, additional measures are conceivable. For example, it is also possible that a sheet steel semifinished product strip, or for example only a single cut resetting spring strip, or locally limited zones of the individual resetting spring strip blank, undergo universal and/or locally delimited plasticization in the Z-axis direction by roller flattening/rolling. This may serve the purpose, as well as a flattening or straightening effect for improving the metal strip flatness, of allowing in addition an advantageous compression stress to be introduced by thickness reduction/compression. This plasticization by rolling/flattening/leveling may be oriented parallel, diagonally or transversely in relation to the sheet strip direction, in order to achieve a planned preferential orientation of the introduced inherent compressive stress in the friction lining resetting spring. Alternatively or additionally, each spring blank may be shot-blasted for plasticization, which can also significantly increase its fatigue strength. Such a profiled or preferably oriented, desirably plasticized, cut strip-like resetting spring blanks, with their window-like inner cutouts, are then mechanically sorted. This is followed by defined radius bending with bending curvature in the Z direction, a further mechanical sorting and a positionally correct riveting process on an assigned back plate rear before the desired friction lining is completed.

An aspect of the present invention concerns equally and alternatively, independently of one another, a) a novel plastically deformable resetting spring, b) a friction lining with plastically deformable resetting spring, c) a motor vehicle disc brake containing said components, and also d) the use of a friction lining with the plastically deformable resetting spring according to an aspect of the invention in a motor vehicle disc brake, and also e) a friction lining production method.

An aspect of the present invention is explained in more detail below with reference to the drawing which shows some preferred structural embodiments as a whole or in part by means of sketched illustrations. In this context, in particular an individual, partial or component disclosure appearing at some point as incomplete because extracted from an overall context, should be understood as a whole, such that the entire disclosure considered by a person skilled in the art makes sense, even if this disclosure apparently requiring interpretation or incomplete may logically require reference to other or secondarily expressly outlined features which are not disclosed explicitly in detail in view of the need to concentrate on the essential elements at the original respective disclosure point.

BRIEF DESCRIPTION OF THE DRAWINGS

FIGS. 6A-C show the spring variant as in FIG. 1, supplemented with bearing and force attack points in the respective spatial axes, and additionally a schematic spring characteristic curve diagram;

DETAILED DESCRIPTION OF THE PREFERRED EMBODIMENTS

Figure 1:
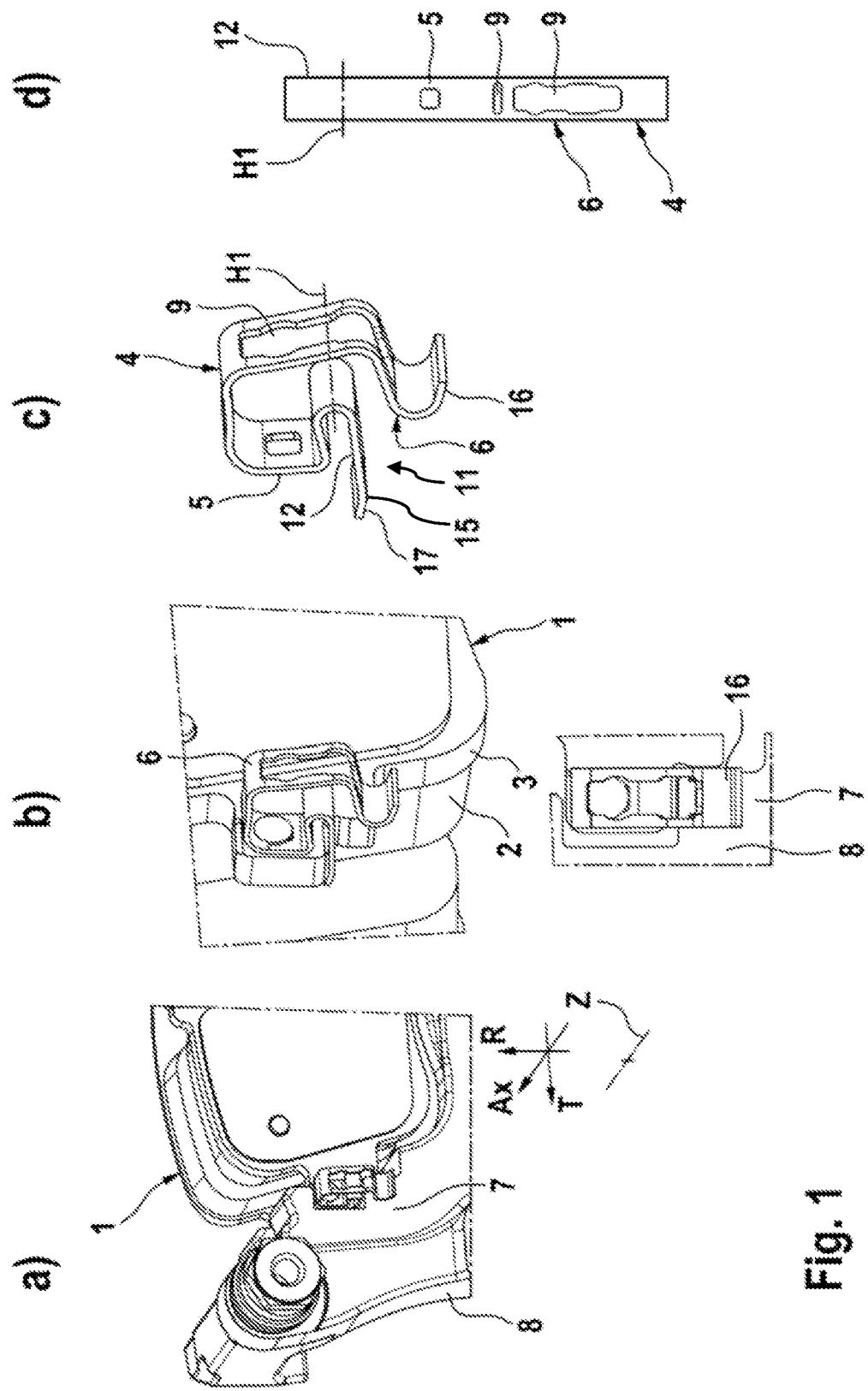
FIGS. 1A-D show various views of a first straight elongate embodiment, i-shaped in strip development, of a riveted resetting spring assembly with radially inwardly bent axial spring leg including floating shoe, and with radial spring leg including sliding shoe, partly with sketches of associated peripheral components such as in particular friction lining back plate, holder and brake housing.
Figure 2:
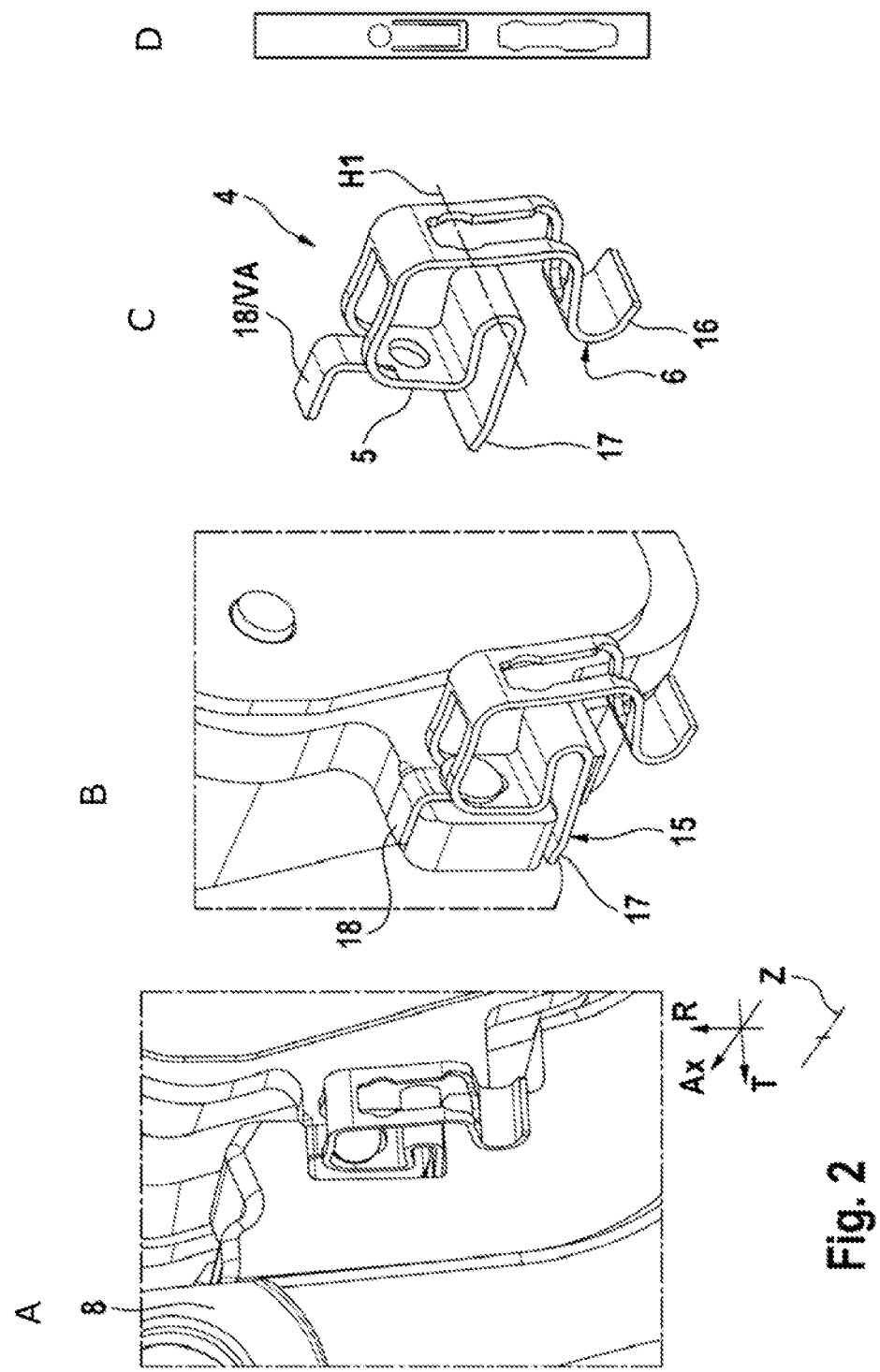
FIGS. 2A-D show a second embodiment, straight in strip development, of a resetting spring assembly with radially inwardly bent axial spring leg, comparable to FIG. 1, wherein security against twisting is achieved however by a separate holder support/twist-prevention stop VA.
Figure 3:
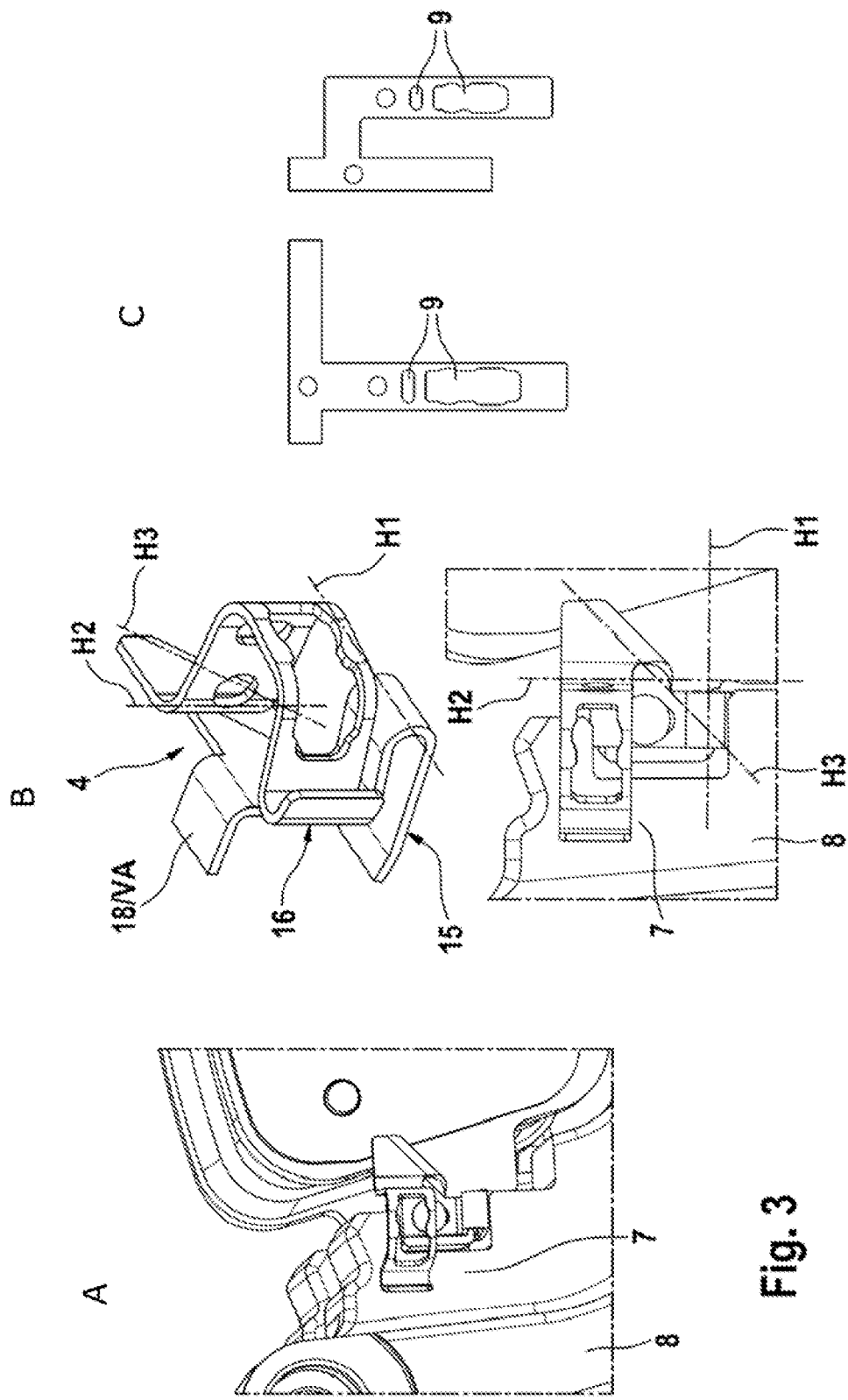
FIGS. 3A-C show various views of two variants (with and without holder support/twist-prevention stop VA) of a third embodiment, bent in strip development, of a resetting spring assembly with tangentially outwardly bent axial spring leg (space saving for combination brake calipers actuatable by a combination of electromechanical and hydraulic means) including floating shoe, partially with sketches of associated peripheral components.
Figure 4:
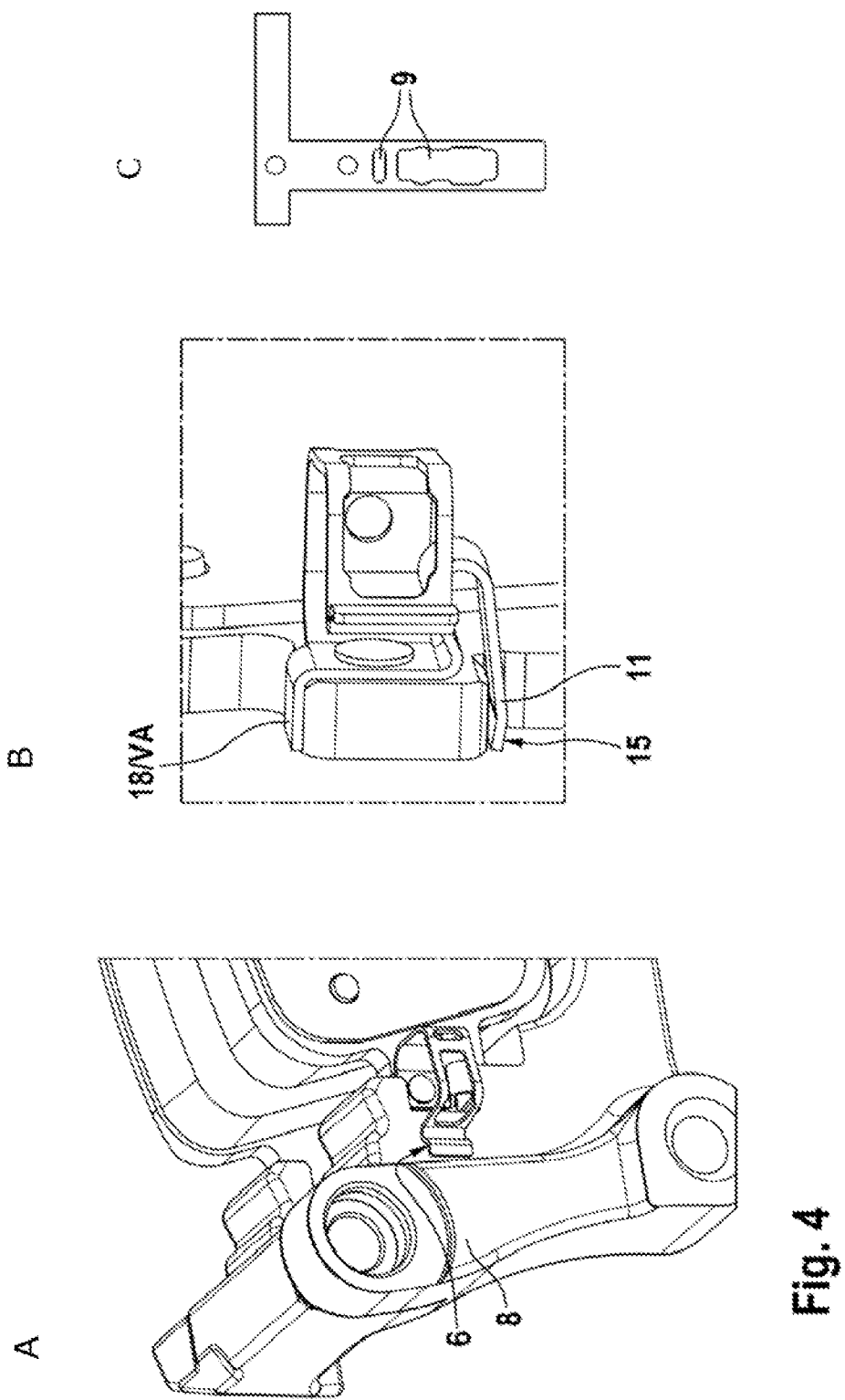
FIGS. 4A-C and FIGS. 5A-C show a variant as in FIG. 3 in supplementary illustrations.
Figure 5:
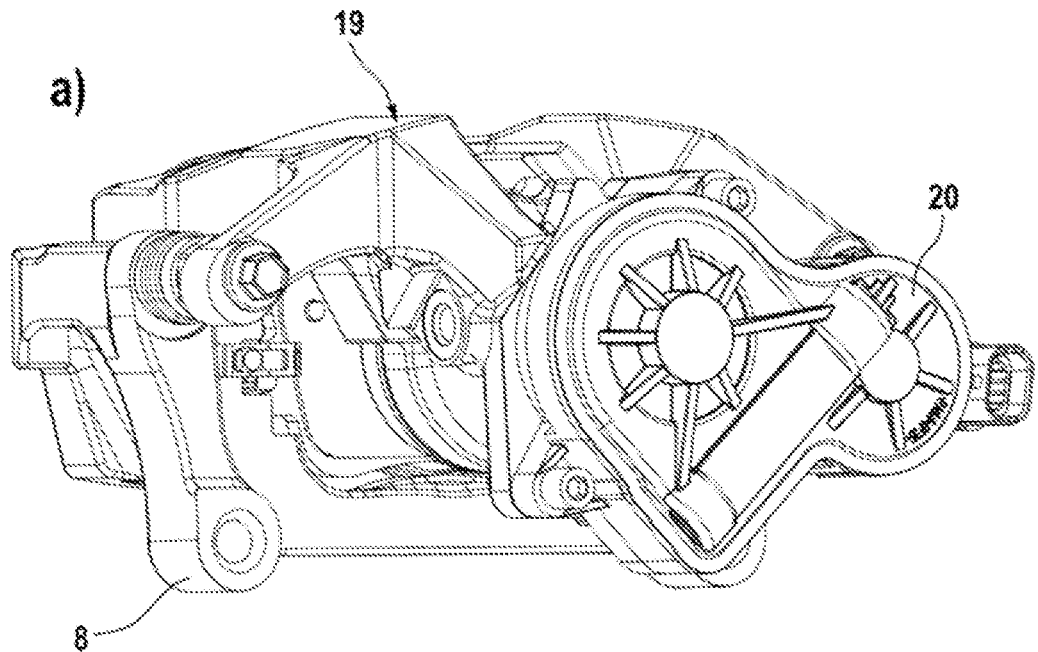
Figure 5:
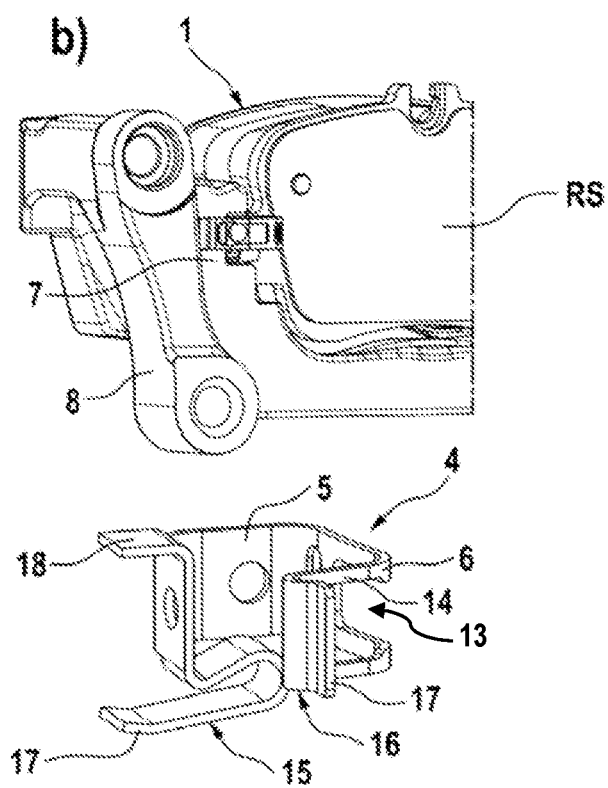
Figure 7:
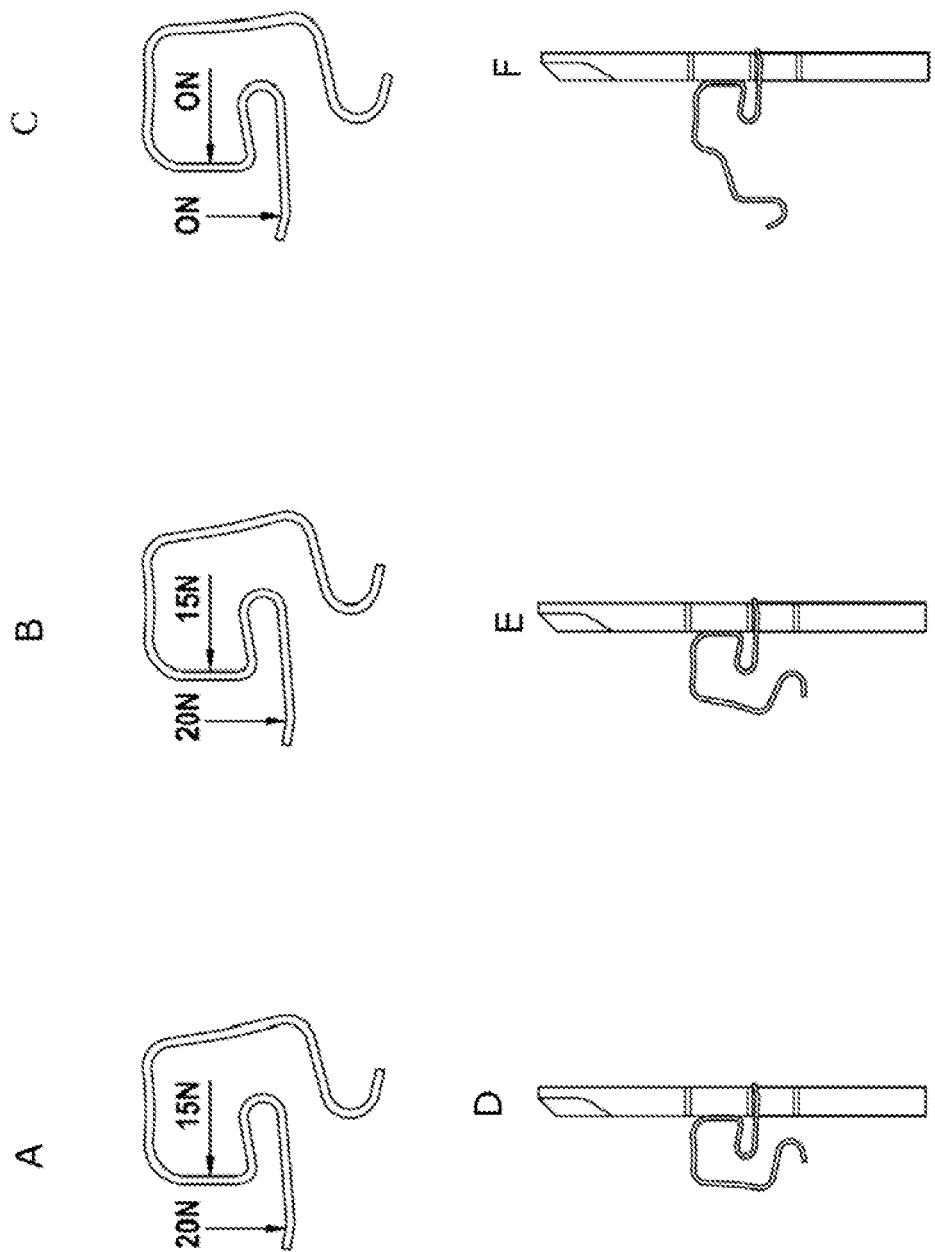
FIGS. 7A-F show in stage sketches a schematically illustrated spring deformation.
Figure 8:
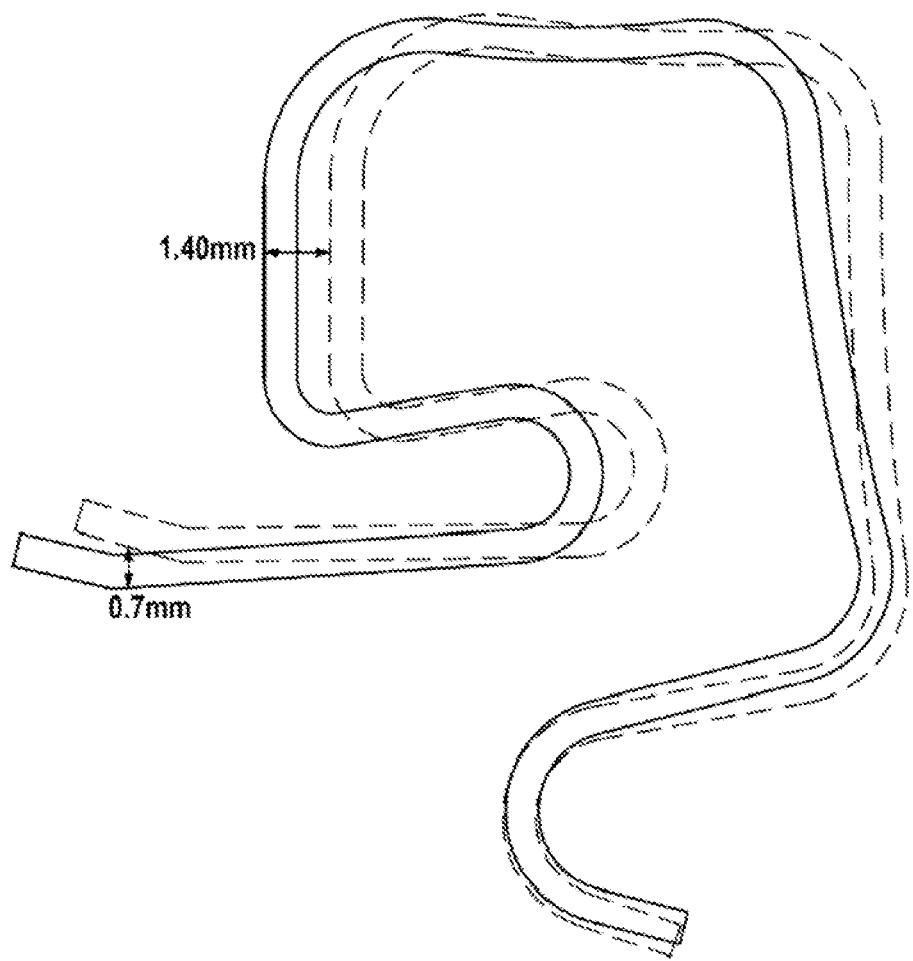
FIG. 8 is an illustration of a force-free spring contour (finished part, side view), and for comparison in projection the elastically preloaded, deformed spring contour immediately after brake assembly.
Figure 9:
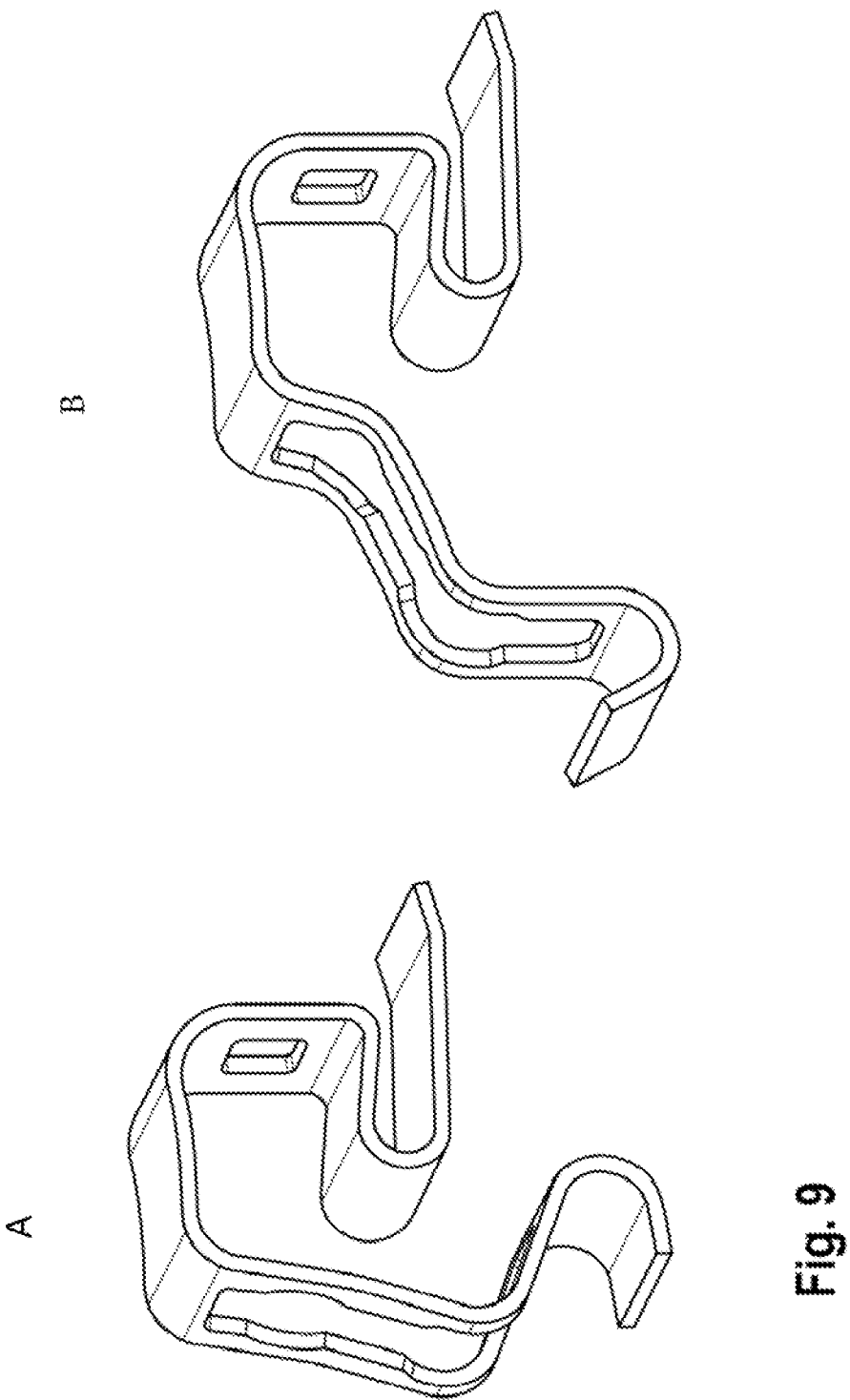
FIGS. 9A-B show in A) an illustration of the nominal spring contour immediately in installation position, and B) the elastically and plastically deformed spring contour after approximately 15 mm of brake lining wear.
Figure 10:
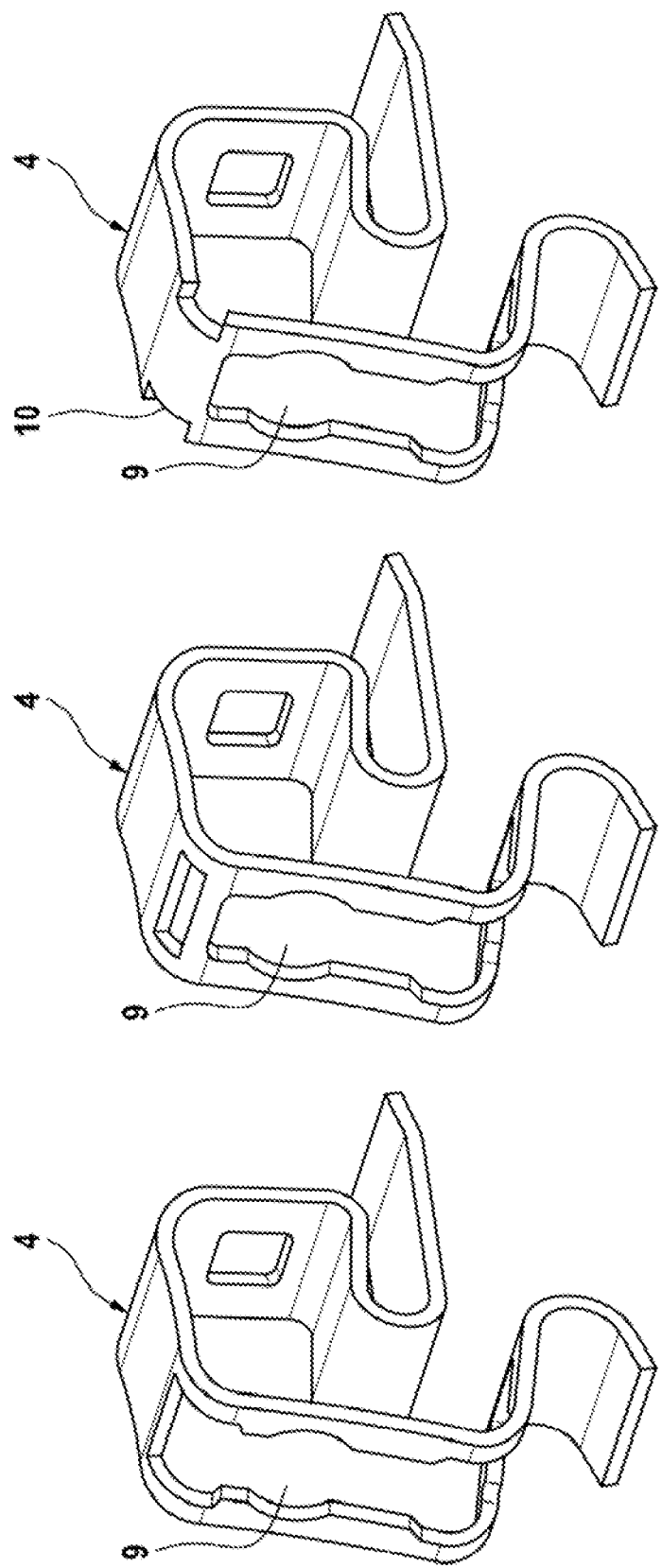
FIGS. 10+11 show various exemplary derivatives of the first embodiment.
Figure 11:
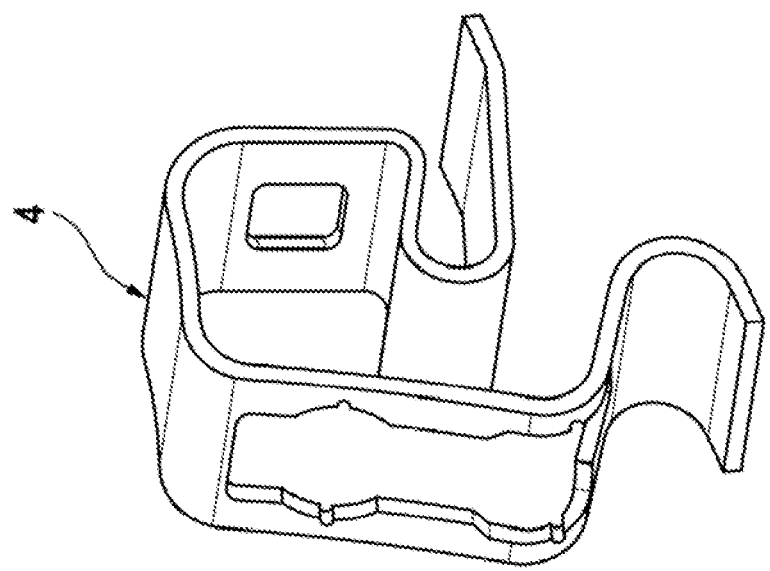
Figure 11:
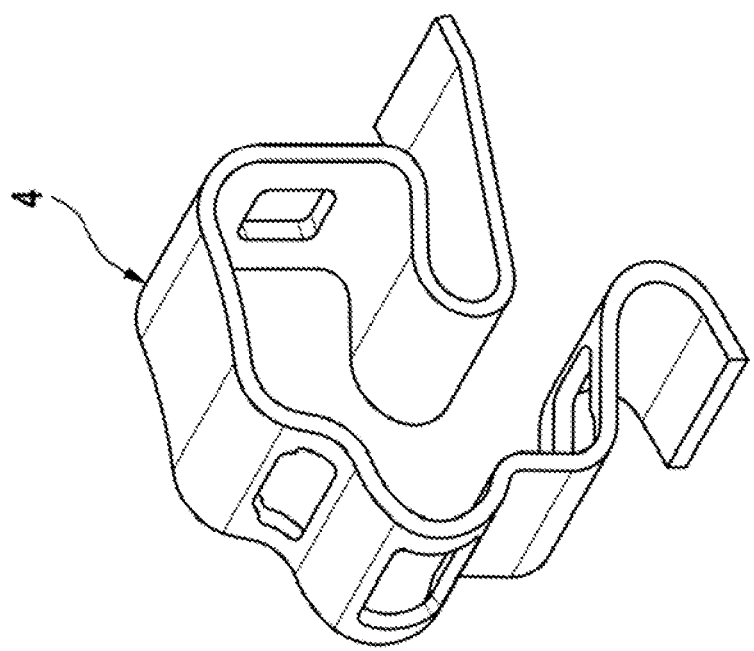
Figure 12:
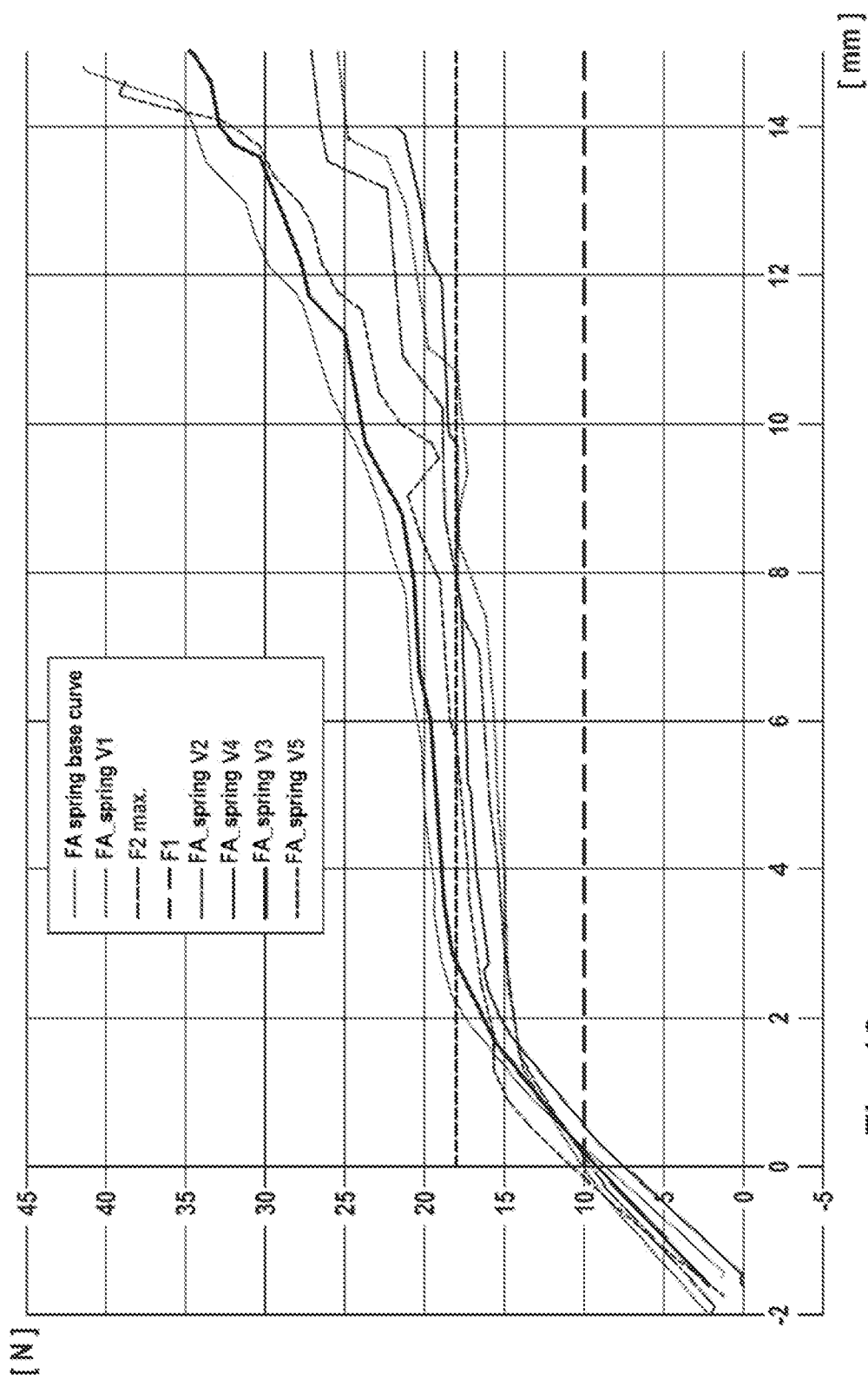
FIG. 12 shows a diagram to illustrate the spring system behavior, where a resetting spring force F in the axially directed spatial direction is shown over a back plate shift in the axial spatial direction.
Figure 13:
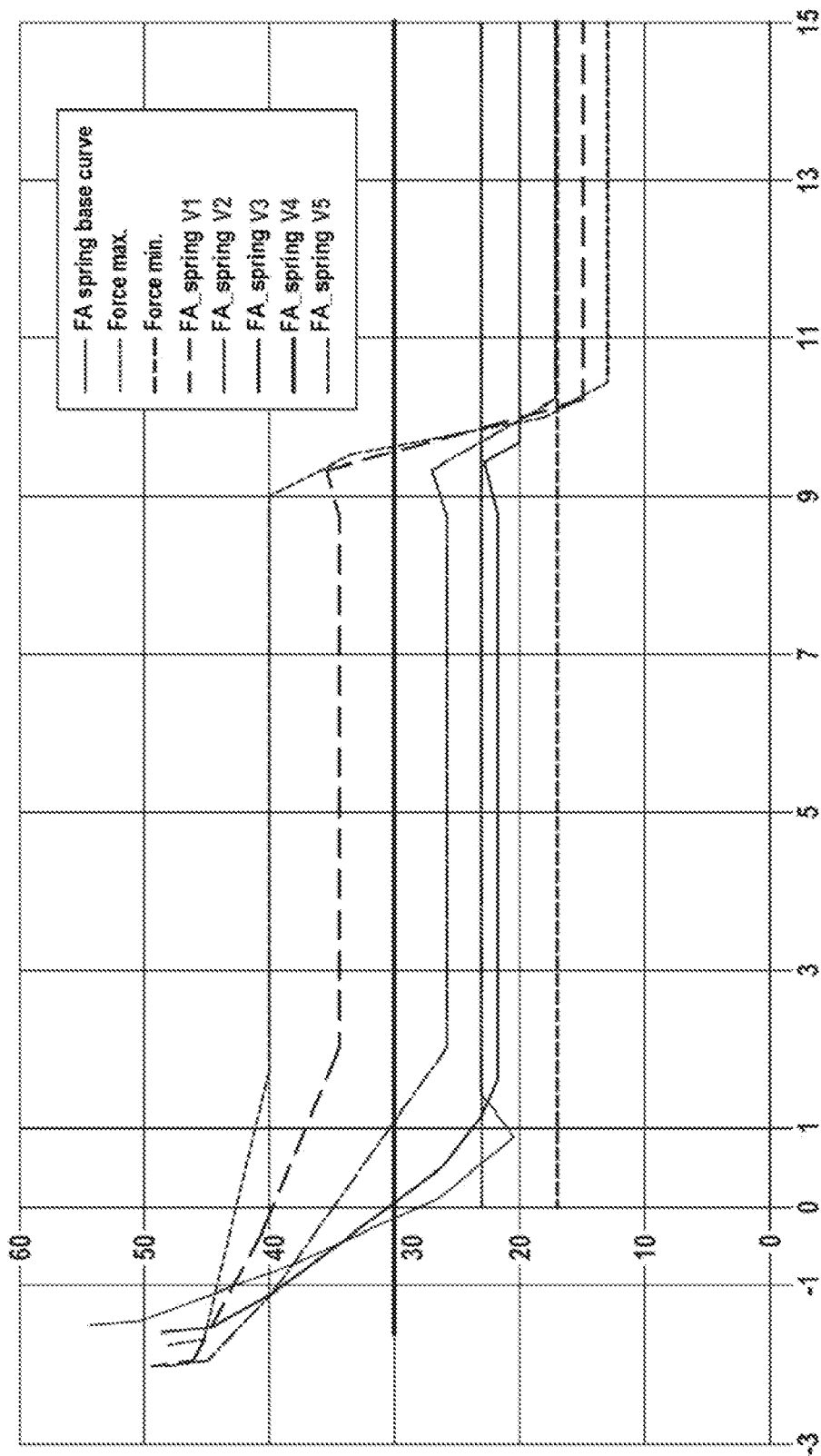
FIG. 13 is a diagram similar to FIG. 12 to illustrate the spring system behavior, wherein however the radial spring force component is shown.
Figure 14:
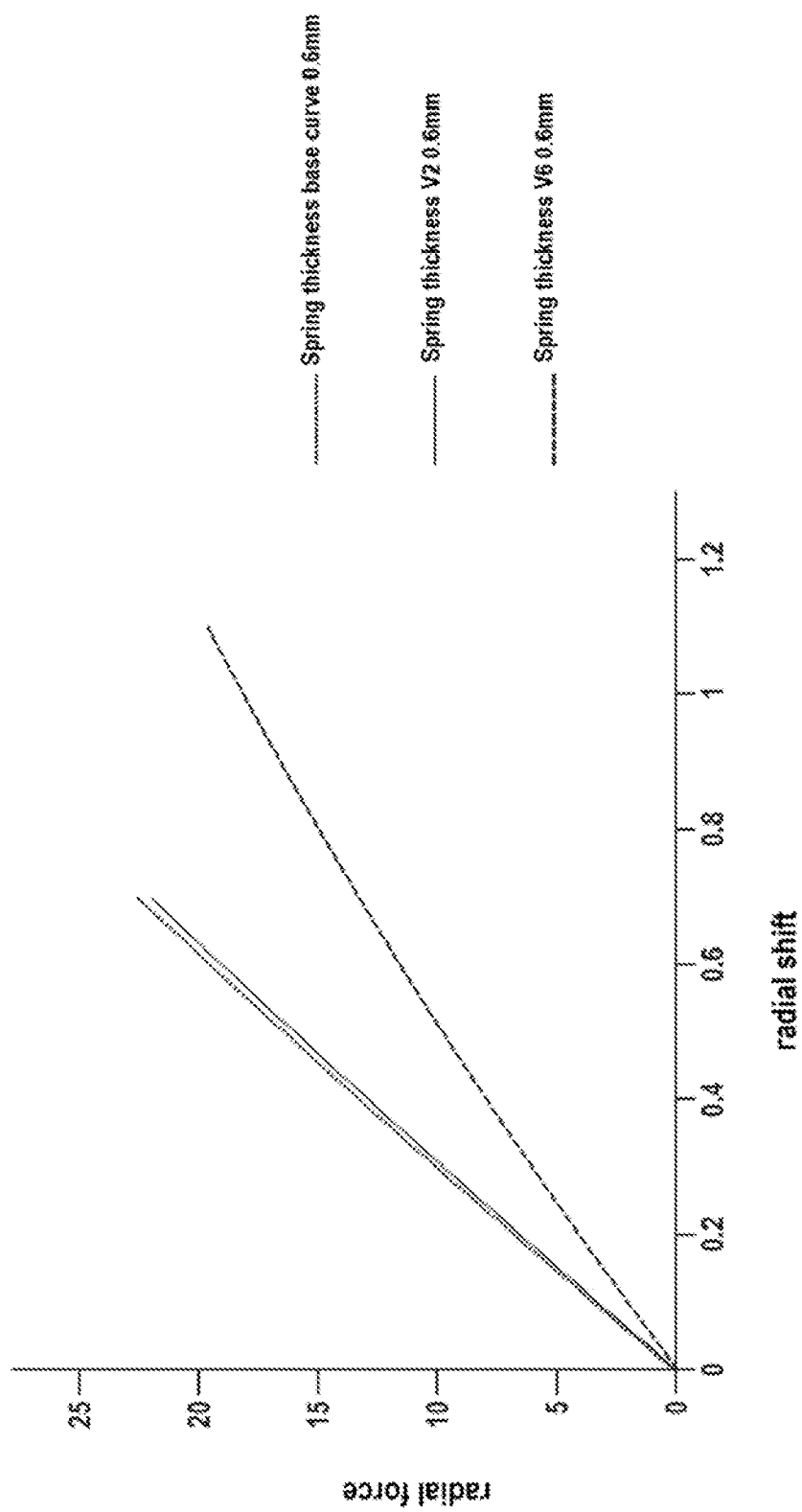
FIG. 14 is a diagram to illustrate the spring system behavior, wherein the radial spring force component is illustrated in relation to a radially directed back plate shift.

One embodiment of the invention includes a disc brake lining assembly 1 comprising friction material 2 which is fixed on the front side of a back plate 3, and with a friction lining resetting spring 4 which is fixed on the rear side of the back plate 3, wherein the friction lining resetting spring 4 has a base 5 and an adjoining elastic resetting spring bow 6, and wherein the resetting spring bow 6 is suitable and intended for sitting on an assigned abutment 7 of a stator/holder 8. The stator/holder 8 may be a brake holder mounted rotationally fixedly, i.e. statically and stationarily with respect to the vehicle, which is suitable and intended to receive two friction linings 1 mounted rotationally fixedly and axially displaceably (axis Ax) parallel to one another in the holder 8 (and usually configured largely mirror-symmetrically), and at the same time to carry a sliding caliper brake housing 19 which, additionally or separately, may comprise an electric motor-gear unit 20 in addition to hydraulic application means. In this system assembly, a friction lining resetting spring 4 allocated fixedly to a friction lining, with its resetting spring bow 6 sitting elastically pretensioned on the abutment 7, preloaded in the axial direction, ensures that under the applied resetting spring force, the respective (usually indirectly actuated) motor vehicle disc brake lining 1 returns automatically in the reverse brake actuation direction, i.e. away from a brake actuation position, in the axial direction.

The disclosed embodiment uses a feature combination in which the friction lining resetting spring 4 with its base 5 is fixedly mounted in relation to the friction linings, and the spring property is achieved by means of an additively composed spring characteristic curve which additively combines a plurality of portions (A, B, C, D), comprising a plurality of quasi-linearly growing straight portions A, C, D and, interposed in-between, at least one degressively curved transition portion B, and wherein the portions A-D each comprise mutually differently defined gradient angles α, β, γ, δ. Among the portions A-D there is at least one part or characteristic curve portion B, C, D which is designed at least partially plastically deformable and which, because of its predetermined defined plastic deformation behavior, serves to automatically allow defined appropriate resetting springing including wear compensation (friction lining+brake disc). The particular advantage of an aspect of the invention is that the disc brake lining 1 and friction lining resetting spring 4 can always be exchanged together, i.e. particularly efficiently, with the positive effect that the incorrect mounting of the resetting spring means is impossible, and unacceptable reuse of worn resetting springs is also impossible, wherein the pre-mounted resetting spring means according to an aspect of the invention always remains easily and properly recyclable with the metallic recyclable materials of the disc brake linings. An aspect of the invention is indeed preferably presented here primarily in conjunction with an application example of a totally non-releasably structured rivet fixing between the back plate and resetting spring assembly, but on the basis of a sufficiently secured fixing, in principle a releasably arranged spring variant is also conceivable without leaving the principles of an aspect of the present invention.

Since a resetting spring bow 6 according to an aspect of the invention is bent in a bow form pointing radially inward in relation to a radial direction R and is fixed on the motor vehicle disc brake lining 1 via the base 5, a space-saving premounted friction lining assembly is presented which is efficiently bundled and resistant to incorrect installation. An alternative adaptation is that the resetting spring bow 6 is bent pointing outward in the tangential direction T. All these alternatives or designs can in principle be used variably for compact integration for both the electromechanical brake with MGU 20 and also for the combination brake with a combination of hydraulic and electromechanical actuation, and in particular also for motor vehicle disc brakes actuated exclusively hydraulically.

In a further embodiment of the invention, a particularly robust resetting spring bow design 6 is provided which is resistant to alternating bending loads when curved by strain-hardening.

Tests have shown that previously known, conventionally bent resetting spring bows can lead to noise defects due to spring resonance. An aspect of the present invention reduces such risks. Strain-hardening is partially possible in relation to the friction lining resetting spring. This may comprise a spring bow curvature with a simple or multiple-repeat S-shape and/or screw winding.

For corrosion-resistant design, it is suitable if the friction lining resetting spring 4 is cut from flat stainless steel material (stainless steel sheet), wherein at least some assembly parts for the purpose of spring characteristic curve modification may be provided partially or completely as a closed frame with at least one passage opening 9 and/or with at least one profiling 10 open at the edge.

A multifunctional resetting spring assembly allows rational logistics with simplified handling and effectively reduced use of material, in that the base 5 is defined largely centrally riveted to the friction lining resetting spring, and wherein the radially pointing end piece of the friction lining resetting spring with resetting spring bow starts from one side thereof, and diametrically opposite this, a diametrically opposite end piece of the spring assembly is defined for an integrated radial spring component 11 and/or an integrated tangential spring component 13, spring components 11 and/or 13 including one and/or several additional spring bows 12 and/or 14, respectively. In other words, the strip development of a cut blank is flat for the sake of simplicity, and flat and tongue-shaped with organically attached additional spring bow 12.

As a result, with the arrangement according to an aspect of the invention, for the first time a disc brake is possible in which a radial spring component 11 and/or a tangential spring component 13 is integrated in the force flow between the motor vehicle disc brake lining 1 and the holder 8 via the spring assembly.

Depending on whether a largely static or relatively movably paired relationship exists between the spring component and the holder 8, a differently varied, improved support for mutual contact may be provided. For example, the mutual support may comprise a transversely oriented, and in particular relatively displaceable coupling between the spring assembly and holder 8. In other words, a dynamically movable spring seat may be defined in the support on the abutment 7. An improved static support on the abutment 7 is also possible if the spring assembly forms at least one sliding shoe 15 and/or at least one floating shoe 16. Said sliding shoe 15 is here particularly advantageously characterized by reproducible relative displaceability (slide friction improvement), whereas a floating or roller shoe 16 offers quite particular advantages of insensitivity to corrosion due to the self-cleaning properties.

In particular to improve the mounting reliability in the context of first installation, or also for reliably executable maintenance processes, for the purpose of reproduction it is suitable if the end piece of each shoe 15, 16 has a bent blade or a curved scoop 17 and/or a combination thereof. It is understood that any punching burrs in the region of the friction lining resetting spring 4 must be correctly avoided or removed from the finished part by barrel finishing or electropolishing or similar, in order to exclude any risk of injury from protruding burrs.

An installation space reduction and/or raw material utilization is rationally improved if an additional spring component is integrally combined on the resetting spring assembly, in that the spring component branches from the spring assembly as a separate spring bow. This is achieved for example if the spring component and resetting spring bow are bent offset orthogonally to one another in the blank strip development. Furthermore, an aspect of the invention allows the additional spring component to branch from the base 5 and/or from the resetting spring bow 6 of the spring assembly.

A particularly efficient embodiment of the spring assembly is defined in that in the projected shadow form, said assembly has a substantially G-shaped, screw-curved bent silhouette, and comprising two spring components 11, 13 including shoes 15, 16 with force effects oriented orthogonally to one another; one in the radial direction R and the other in the axial direction Ax.

LIST OF REFERENCE DESIGNATIONS

1 Disc brake lining
2 Friction material
3 Back plate
4 Friction lining resetting spring
5 Base
6 Resetting spring bow
7 Abutment
8 Holder
9 Passage opening
10 Profiling (open at edge)
11 Radial spring component
12 Spring bow
13 Tangential spring component
14 Spring bow
15 Sliding shoe
16 Floating shoe
17 Blade/scoop
18 Twist prevention stop/support (VA)
19 Sliding caliper brake housing
20 MGU (electric motor-gear unit)
A,B,C,D Portion
$\alpha,\beta,\gamma,\delta$ Gradient angle
T Tangential direction
R Radial direction
Ax Axial direction (parallel to a theoretical wheel rotational axis Z)
RS Friction lining centre of gravity (theoretical resulting friction force attack point)
H1 Tangential bending axis
H2 Radial bending axis

The invention claimed is:

1. A motor vehicle disc brake lining assembly which can be mounted in a holder so as to be rotationally fixed and axially displaceable relative to a theoretical wheel rotational axis, comprising:
    friction material which is fixed on the front side of a back plate; and
    a friction lining resetting spring which is fixed on the rear side of the back plate,
    wherein the friction lining resetting spring has a base and a connected resetting spring bow which is bent into a spatial curve and incorporates elasticity such that the resetting spring bow is suitable and intended for sitting elastically pretensioned on an abutment of the holder in braking operation, such that the motor vehicle disc brake lining can be reset under the resetting spring force or spring preload in the axial direction out of a brake actuation position; the friction lining resetting spring has a spring characteristic force-travel curve which is additively composed of a plurality of portions comprising a plurality of straight portions A, C, D and at least one curved transition portion B between the straight portions A and C, the portions A, C, D comprising respective mutually differently defined gradient angles $\alpha$, $\gamma$, $\delta$, wherein the at least one curved transition portion B is degressively curved,
    wherein, the friction lining resetting spring is designed at least partially plastically deformable and which, serves to automatically allow demand-oriented spring resetting on the basis of wear compensation.

2. The motor vehicle disc brake lining assembly as claimed in claim 1, wherein the friction lining resetting spring is designed to at least in part include a G-shaped curve.

3. The motor vehicle disc brake lining assembly as claimed in claim 1, wherein the resetting spring bow of the friction lining resetting spring is bent in a bow form, pointing radially inwardly relative to a radial direction of the wheel rotational axis with a tangentially extending bend axis, such that the abutment of the resetting spring bow is arranged radially lower than the base.

4. The motor vehicle disc brake lining assembly as claimed in claim 1, wherein the resetting spring bow of the friction lining resetting spring is bent in a bow form, pointing tangentially outwardly relative to a tangential direction of the wheel rotational axis with radially extending bend axis, such that the abutment is offset tangentially outwardly at the radial height of a friction lining centre point.

5. The motor vehicle disc brake lining assembly as claimed in claim 1, wherein the friction lining resetting spring defines a single S-shape or multiple S-shape and/or screw-wound spring bow curvature.

6. The motor vehicle disc brake lining assembly as claimed in claim 1, wherein the friction lining resetting spring is cut from flat steel material, and wherein parts thereof, for the purpose of spring characteristic force-travel curve modification, are provided as a frame with at least one passage opening and/or with at least one profiling open at the edge.

7. The motor vehicle disc brake lining assembly as claimed in claim 1, wherein the friction lining resetting spring is formed as a multifunctional resetting spring assembly in that the base defines a middle center, wherein a radially angled end piece of the friction lining resetting spring defines the resetting spring bow, and wherein an end piece of the friction lining resetting spring diametrically opposite the radially angled end piece defines an integral radial spring component and/or an integral tangential spring component with at least one and/or a plurality of additional spring bows.

8. The motor vehicle disc brake lining assembly as claimed in claim 1, wherein a tangential force spring component is included between the motor vehicle disc brake lining and the holder by the friction lining resetting spring.

9. The motor vehicle disc brake lining assembly as claimed in claim 1, wherein the friction lining resetting spring (4) has at least one shoe with a design as a sliding shoe and/or a floating shoe.

10. The motor vehicle disc brake lining assembly as claimed in claim 9, wherein at its end piece, the shoe has a bent or a curved end and/or a combination thereof.

11. The motor vehicle disc brake lining assembly as claimed in claim 7, wherein an additional spring component is integrally combined with the resetting spring assembly, in that each spring component branches from the spring assembly as a separate spring bow.

12. The motor vehicle disc brake lining assembly as claimed in claim 7, wherein the integral radial spring component and/or the integral tangential spring component and the resetting spring bow are bent offset orthogonally to one another with respect to a blank strip development.

13. The motor vehicle disc brake lining assembly as claimed in claim 1, wherein the friction lining resetting spring branches from the base and/or from the resetting spring bow of the spring assembly.

14. The motor vehicle disc brake lining assembly as claimed in claim 1, wherein at least one dynamically movable spring support is defined for coupling or support between the friction lining resetting spring and the holder.

15. The motor vehicle disc brake lining assembly as claimed in claim 1, wherein the friction lining resetting spring has a largely G-shaped bent silhouette and comprises two spring components including shoes oriented orthogonally to one another in the radial force direction and the axial force direction.

16. The motor vehicle disc brake lining assembly as claimed in claim 1, wherein the friction lining resetting spring is bent substantially T-shaped as a multifunctional spring component, and for this additionally defines a bent twist prevention stop leg/holder support.

17. The motor vehicle disc brake lining assembly as claimed in claim 1, wherein the plurality of straight portions A, C, D are linearly growing, such that increasing travel results in increasing force.

\* \* \* \* \*